June 26, 1951   J. F. WILCOX   2,558,472
CAR WASHING APPARATUS
Filed May 17, 1950   3 Sheets-Sheet 1

James F. Wilcox
INVENTOR.

BY Clarence A. O'Brien
and Harvey B. Jacobson
Attorneys

June 26, 1951  J. F. WILCOX  2,558,472
CAR WASHING APPARATUS
Filed May 17, 1950  3 Sheets-Sheet 2
Fig. 5
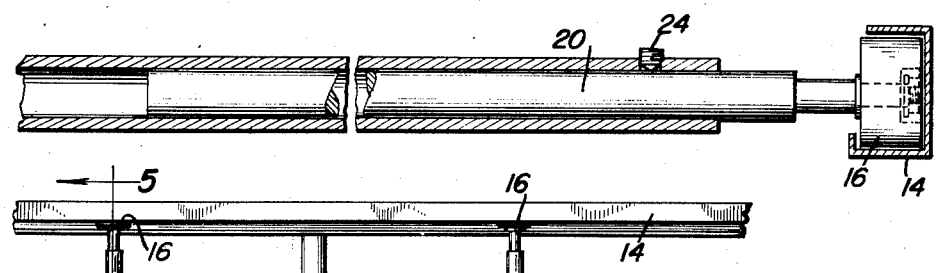
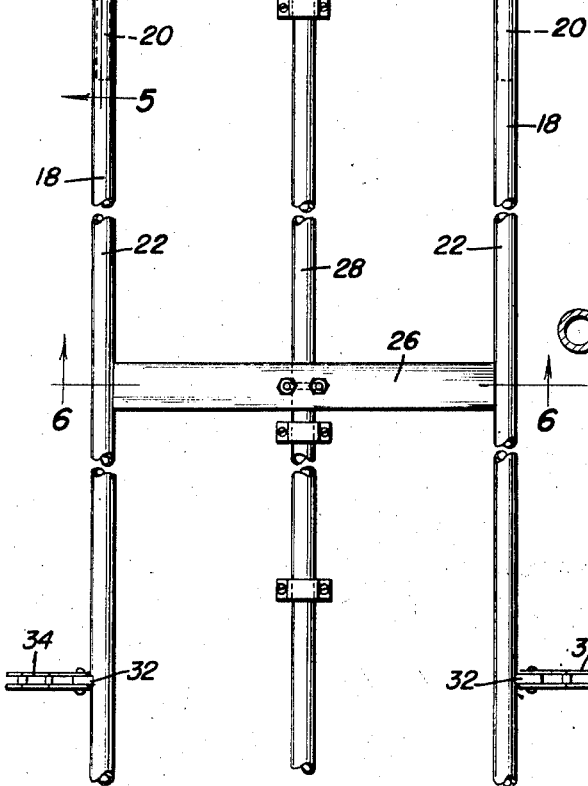
Fig. 4
Fig. 6
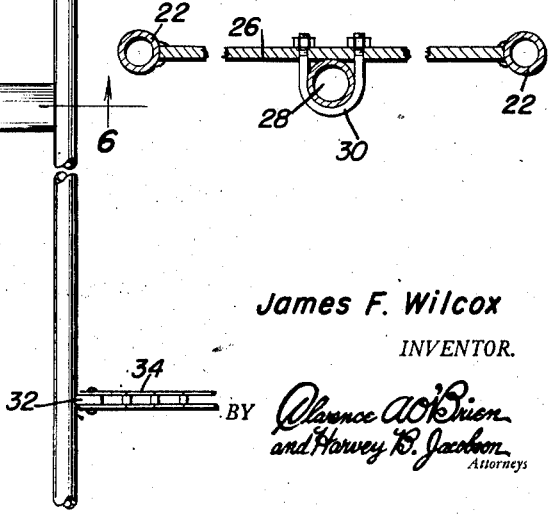
James F. Wilcox
INVENTOR.
BY Clarence A. O'Brien
and Harvey B. Jacobson
Attorneys June 26, 1951  J. F. WILCOX  2,558,472
CAR WASHING APPARATUS
Filed May 17, 1950  3 Sheets-Sheet 3
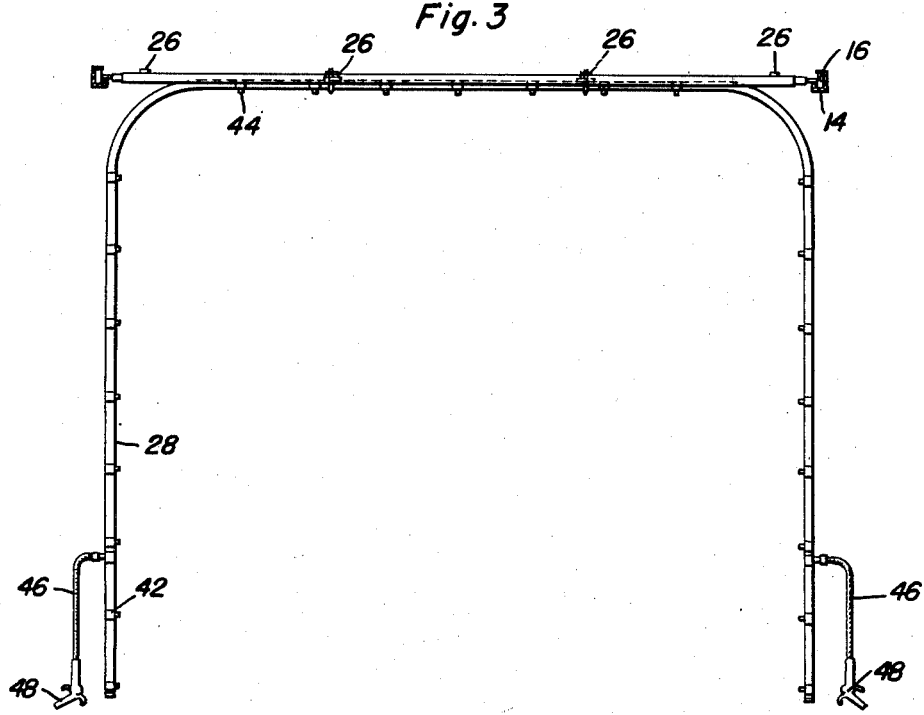
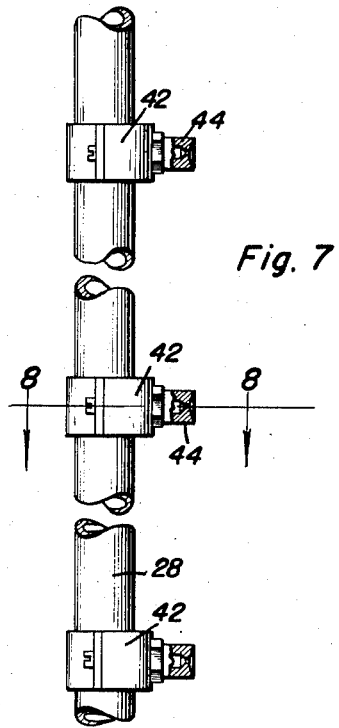
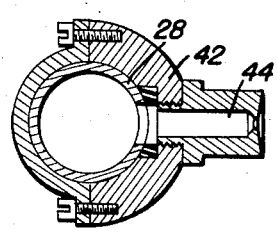
James F. Wilcox
INVENTOR.

Patented June 26, 1951

2,558,472

UNITED STATES PATENT OFFICE 2,558,472

CAR WASHING APPARATUS

James F. Wilcox, Ottawa, Ill., assignor of twenty per cent to Joseph E. Lanuti, Ottawa, Ill.

Application May 17, 1950, Serial No. 162,507

9 Claims. (Cl. 134—100)

This invention relates to a car washing apparatus having means for readily and easily controlling the spraying and rinsing operation in a simple manner.

An object of this invention is to provide a car washing apparatus having a central control system, whereby the device may be readily controlled and the automobiles to be washed may be readily sprayed with water, a soapy water mix, or such solution as desired.

A further object of this invention is to provide a novel system for supporting a spray unit in a manner such that the spray unit is readily movable by an endless belt conveyor over the length of the car as is necessary.

Still another object of this invention is to provide pneumatic means for forcing a soapy water mix to the spray unit so that such may be applied to the outer surface of the car in an efficient manner.

A yet further object of this invention is to provide a spray unit having attached thereto flexible hose unit for enabling the under portions of the car such as the wheels, fender skirts and like to be easily washed.

Still further objects of the invention reside in the provision of a car washing apparatus that is strong, durable, highly efficient in operation, simple in construction and manufacture, capable of being readily installed in a desired wash rack or room, and which will be relatively inexpensive to operate needing a minimum amount of labor to complete the washing operation.

These, together with the various ancillary objects of the invention which will become apparent as the following description proceeds, are attained by this car washing apparatus, a preferred embodiment of which is illustrated in the accompanying drawings, by way of example only, wherein:

Figure 3 is a front elevational view of the spray unit used in the present invention;

Figure 4 is an enlarged partial view of the spray unit;

Figure 5 is a vertical sectional detail as taken along line 5—5 of Figure 4;

Figure 6 is an enlarged vertical sectional view taken along line 6—6 of Figure 4;

Figure 7 is an enlarged detail showing the construction of the spray unit and the nozzle used in the present invention; and Figure 8 is an enlarged sectional view as taken along line 8—8 in Figure 7.

Figure 1:
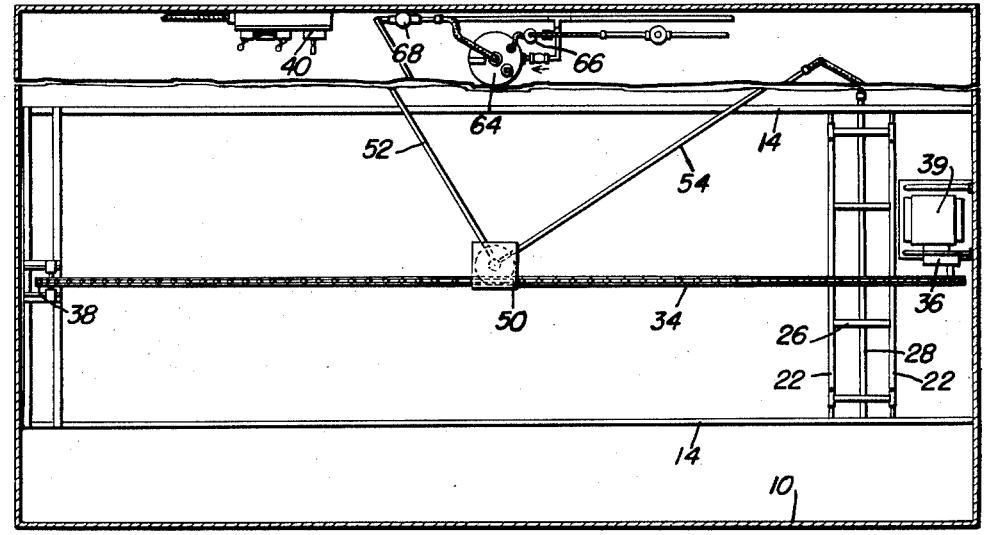
Figure 1 is a plan view of the car washing apparatus comprising the present invention.
Figure 2:
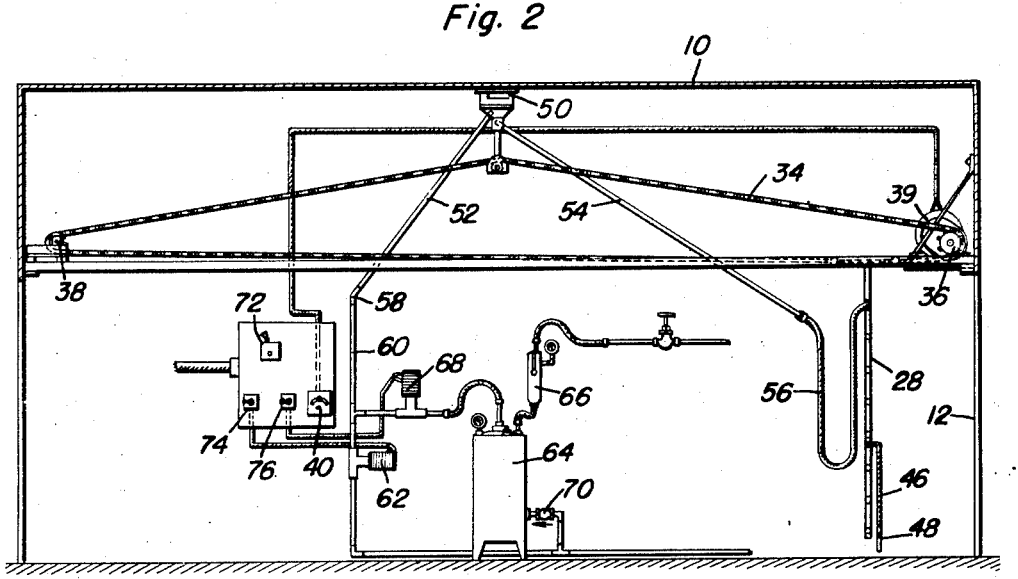
Figure 2 is a side elevational view of the car washing apparatus.

With continuing reference to the accompanying drawings wherein like reference numerals designate similar parts throughout the various views, reference numeral 10 designates a wash rack room into which an automobile may be readily driven through an opening or passageway 12. Extending longitudinally between the walls of the room 10 are substantially channel-shaped trackways 14 within which bearing rollers 16 are pivotally mounted on the ends of the pair of spaced support members 18. In actuality, the rollers 16 are secured to telescoping members 20 held within two tube members 22 and held in place by set screws 24 in a manner permitting easy adjustment of the spray unit including the support members in order that the support members may be used for car washing apparatus having trackways 14 which are spaced apart a varying distance within limits.

Interconnecting the two tube members 22 and terminally welded thereto are spacer members 26, to these spacer members 26 there is secured a substantially inverted U-shaped spray unit 28 by means of clamps 30. In addition, to the members 22 there are welded eyes 32 to which are attached links or a chain belt 34 thus enabling the spray apparatus to form one link of an endless belt conveyor which is entrained about pulley wheels 36 and 38 and which is driven by a suitable electric motor 39 which is reversible and which is controlled by a switch 40.

The spray unit 28 consists of a hollow tubular conduit closed at each end and having a plurality of apertures therein about which clamps 42 are secured and in which the clamp nozzles as indicated generally at 44 are emplaced. The nozzles 44 are spray nozzles of two different sizes and are alternately placed throughout the spray unit 28. Adjacent the lower portions of the spray unit 28 there are attached flexible conduits 46 and pressure control valves comprising hand actuated pressure valves 48. The flexible conduits 46 and the pressure valves are used when it is desired to wash the wheels or other lower portions of the automobile during the washing operations which are performed on the car or other vehicle.

A bracket 50 is mounted substantially centrally in the room 10 and has pivotally connected thereto pipes 52 and 54. A flexible hose 56 connects the pipe 54 with the spray unit 28 and the pipe 52 is connected through a joint 58 to a conduit 60 leading to a water supply means. The switch actuated valve 62 is provided for controlling the passage of water into the pipe 52 and hence into the spray unit 28.

There is provided a reservoir 64 in which a soap solution can be in place and which is connected through a pressure regulator 66 to a compressed air supply for placing the solution into the spray unit 28. A primary actuated valve 68 controls the flow of fluid from the tank 64 and the tank is connected to a suitable conduit and valve 70 to the water supply. A master switch 72 is provided for controlling the operation of the whole machine and individual switches 74 and 76 are provided for controlling the actuated valves 62 and 68 respectively.

The car washing apparatus is operated in the following manner:

An automobile is driven into the wash rack room 10 and is centered in the spray unit 28. The switch 78 is actuated and the sprayer is moved longitudinally over the car by actuating the switch 40. The water spray covers the entire surface of an automobile and the effect thereof is to normalize the temperature of the surface being cleaned. That is, the water temperature normally varied between 68° and 72° and creates the same temperature on the surface of the vehicle. This will wet the surface of the car completely. The control switch 74 is then shut off and the soap mix control valve 76 is actuated. The water contained in the reservoir 64 is then urged through the spray unit 28 and a car is thus washed with the soapy solution. Then the entire outside surface of the car may be rubbed by such individuals as is necessary and then rinsed by turning on the valve 74 and spraying the car as may be necessary. The precise means and manner of rinsing or spraying the car is of course optional upon completion of the rinsing, the car may then be backed out of the rack room and either dried thoroughly with turkish towels and chamois or may be left to dry.

Since from the foregoing the construction and advantages of the car washing apparatus will be readily apparent, further description is believed to be unnecessary.

However, since numerous modifications will readily occur to those skilled in the art after a consideration of the foregoing specification and accompanying drawings, it is not intended to limit the invention to the exact embodiment shown and described, but all suitable modifications and equivalents may be resorted to falling within the scope of the appended claims.

Having described the invention, what is claimed as new is:

1. A car washing device comprising a pair of spaced trackways, an endless conveyor suspended in parallel relationship to said tracks, a spray apparatus movably carried by said trackways, said apparatus being connected to said conveyor, and means for activating said conveyor to control the movements of said apparatus, said spray apparatus including a pair of spaced support elements, bearing means secured to the ends of said elements, said bearings engaging said trackways, spacer members extending between and terminally secured to said support elements, and a substantially inverted U-shaped spray unit detachably secured to said spacer members.

2. A car washing device comprising a pair of spaced trackways, an endless conveyor suspended in parallel relationship to said tracks, a spray apparatus movably carried by said trackways, said apparatus being connected to said conveyor, and means for activating said conveyor to control the movements of said apparatus, said spray apparatus including a pair of spaced support elements, bearing means secured to the ends of said elements, said bearings engaging said trackways, spacer members extending between and terminally secured to said support elements, a substantially inverted U-shaped spray unit detachably secured to said spacer members, means selectively connecting a water supply conduit to said spray unit, a soap mix reservoir, means for selectively opening and closing communication between said reservoir and said spray unit, and pneumatic means for forcing said soap mix through said spray unit.

3. A car washing device comprising a pair of spaced trackways, an endless conveyor suspended in parallel relationship to said tracks, a spray apparatus movably carried by said trackways, said apparatus being connected to said conveyor, and means for activating said conveyor to control the movements of said apparatus, said spray apparatus including a pair of spaced support elements, bearing means secured to the ends of said elements, said bearings engaging said trackways, spacer members extending between and terminally secured to said support elements, a substantially inverted U-shaped spray unit detachably secured to said spacer members, means selectively connecting a water supply conduit to said spray unit, a soap mix reservoir, means for selectively opening and closing communication between said reservoir and said spray unit, said last recited means including a solenoid actuated valve, and pneumatic means for forcing said soap mix through said spray unit.

4. A car washing device comprising a pair of spaced trackways, an endless conveyor suspended in parallel relationship to said tracks, a spray apparatus movably carried by said trackways, said apparatus being connected to said conveyor, and means for activating said conveyor to control the movements of said apparatus, said spray apparatus including a pair of spaced support elements, bearing means secured to the ends of said elements, said bearings engaging said trackways, spacer members extending between and terminally secured to said support elements, and a substantially inverted U-shaped spray unit detachably secured to said spacer members, said spray unit having a central connecting member extending transversely between said trackways.

5. A car washing device comprising a pair of spaced trackways, an endless conveyor suspended in parallel relationship to said tracks, a spray apparatus movably carried by said trackways, said apparatus being connected to said conveyor, and means for activating said conveyor to control the movements of said apparatus, said spray apparatus including a pair of spaced support elements, bearing means secured to the ends of said elements, said bearings engaging said trackways, spacer members extending between and terminally secured to said support elements, a substantially inverted U-shaped spray unit detachably secured to said spacer members, said spray unit having a central connecting member extending transversely between said trackways, leg portions connected to said central connecting members, and flexible conduits secured to said leg portions.

6. A car washing device comprising a pair of spaced trackways, an endless conveyor suspended in parallel relationship to said tracks, a spray apparatus movably carried by said trackways, said apparatus being connected to said conveyor, and means for activating said conveyor to control the movements of said apparatus, said spray apparatus including a pair of spaced support elements, bearing means secured to the ends of said elements, said bearings engaging said trackways, spacer members extending between and terminally secured to said support elements, a substantially inverted U-shaped spray unit detachably secured to said spacer members, said spray unit having a central connecting member extending transversely between said trackways, leg portions connected to said central connecting member, and flexible conduits secured to said leg portions, means selectively connecting a water supply conduit to said spray unit, a soap mix reservoir, means for selectively opening and closing communication between said reservoir and said spray unit, and pneumatic means for forcing said soap mix through said spray unit.

7. A car washing device comprising a pair of spaced trackways, an endless conveyor suspended in parallel relationship to said tracks, a spray apparatus movably carried by said trackways, said apparatus being connected to said conveyor, and means for activating said conveyor to control the movements of said apparatus, said spray apparatus including a pair of spaced support elements, bearing means secured to the ends of said elements, said bearings engaging said trackways, spacer members extending between and terminally secured to said support elements, a substantially inverted U-shaped spray unit detachably secured to said spacer members, means selectively connecting a water supply conduit to said spray unit, a soap mix reservoir, means for selectively opening and closing communication between said reservoir and said spray unit, said last recited means including a solenoid actuated valve, and pneumatic means for forcing said soap mix through said spray unit, said spray unit having a central connecting member extending transversely between said trackways.

8. A car washing device comprising a pair of spaced trackways, an endless conveyor suspended in parallel relationship to said tracks, a spray apparatus movably carried by said trackways, said apparatus being connected to said conveyor, and means for activating said conveyor to control the movements of said apparatus, said spray apparatus including a pair of spaced support elements, bearing means secured to the ends of said elements, said bearings engaging said trackways, spacer members extending between and terminally secured to said support elements, a substantially inverted U-shaped spray unit detachably secured to said spacer members, means selectively connecting a water supply conduit to said spray unit, a soap mix reservoir, means for selectively opening and closing communication between said reservoir and said spray unit, said last recited means including a solenoid actuated valve, and pneumatic means for forcing said soap mix through said spray unit, said spray unit having a central connecting member extending transversely between said trackways, leg portions connected to said central connecting member, and flexible conduits secured to said leg portions.

9. A car washing device comprising a pair of spaced trackways, an endless conveyor suspended in parallel relationship to said tracks, a spray apparatus movably carried by said trackways, said apparatus being connected to said conveyor, and means for activating said conveyor to control the movements of said apparatus, said spray apparatus including a pair of spaced support elements, bearing means secured to the ends of said elements, said bearings engaging said trackways, spacer members extending between and terminally secured to said support elements, a substantially inverted U-shaped stray unit detachably secured to said spacer members, means selectively connecting a water supply conduit to said spray unit, a soap mix reservoir, means for selectively opening and closing communication betwen said reservoir and said spray unit, and pneumatic means for forcing said soap mix through said spray unit, said means selectively connecting a water supply unit to said spray unit including a pair of conduits and means rotatably mounting said pair of conduits above said spray unit.

JAMES F. WILCOX.

REFERENCES CITED

The following references are of record in the file of this patent:

UNITED STATES PATENTS

| Number | Name | Date |
| --- | --- | --- |
| 1,720,332 | Kehoe | July 9, 1929 |
| 1,931,444 | Mackin | Oct. 17, 1933 |
| 2,342,533 | Edwards | Feb. 23, 1944 |
| 2,465,562 | Hopper | Mar. 29, 1949 |
| 2,489,445 | Benzuly | Nov. 29, 1949 |